United States Patent [19]

DeJager et al.

[11] Patent Number: 5,012,346
[45] Date of Patent: Apr. 30, 1991

[54] ILLUMINATION SYSTEM FOR A FILM SCANNER

[75] Inventors: Donald DeJager; Andrew F. Kurtz; David Kessler, all of Rochester; Leslie G. Moore, Jr., Webster, all of N.Y.

[73] Assignee: Eastman Kodak Company, Rochester, N.Y.

[21] Appl. No.: 421,894

[22] Filed: Oct. 16, 1989

[51] Int. Cl.⁵ .............. H04N 3/36; H04N 5/253; H04N 9/11; G03B 27/58
[52] U.S. Cl. .................. 358/214; 358/54; 355/71
[58] Field of Search ........... 358/54, 214, 487, 493, 358/494, 495, 496; 355/71, 38, 35, 32, 67; 351/105, 106, 108; 362/355, 356; 356/236; 250/228

[56] References Cited

U.S. PATENT DOCUMENTS

| | | | |
|---|---|---|---|
| 3,212,417 | 10/1965 | Gundlach | 95/1.7 |
| 3,241,440 | 3/1966 | Kugler | 88/24 |
| 3,647,955 | 3/1972 | Reader et al. | 358/214 |
| 3,944,739 | 3/1976 | Sword et al. | 358/54 |
| 3,988,537 | 10/1976 | Cooley | 178/7.6 |
| 4,009,489 | 2/1977 | Seer, Jr. | 358/54 |
| 4,013,355 | 3/1977 | Mailloux | 355/32 |
| 4,226,522 | 10/1980 | Marshall | 355/1 |
| 4,264,193 | 4/1981 | Oonishi et al. | 355/32 |
| 4,321,630 | 3/1982 | Kramer | 358/294 |
| 4,396,834 | 8/1983 | Appel et al. | 250/216 |
| 4,422,100 | 12/1983 | DuVall et al. | 358/293 |
| 4,506,300 | 3/1985 | Fearnside | 358/214 |
| 4,568,984 | 2/1986 | Juergensen et al. | 358/293 |
| 4,624,555 | 11/1986 | Tokuhara et al. | 355/71 |
| 4,639,787 | 1/1987 | Isogai et al. | 358/214 |
| 4,690,564 | 9/1987 | Morgenstern et al. | 356/445 |
| 4,755,875 | 7/1988 | Fremont | 358/214 |
| 4,797,711 | 1/1989 | Sasada et al. | 355/32 |
| 4,833,532 | 5/1989 | Abe | 358/32 |
| 4,856,905 | 8/1989 | Nishi | 250/548 |
| 4,864,408 | 9/1989 | Bridges et al. | 358/214 |
| 4,868,383 | 9/1989 | Kurtz et al. | 250/228 |

Primary Examiner—Howard W. Britton
Assistant Examiner—Wendy R. Greening
Attorney, Agent, or Firm—Donald D. Schaper

[57] ABSTRACT

An illumination system for a film scanner is disclosed which comprises a light source and optics for providing a line of light on a film. Light transmitted through the film is imaged onto photosensor elements such as CCD arays. In order to obtain a high quality electronic image, a xenon light source is used, color filters are included in the system to control the spectral content of the light provided to the film gate, and an integrating cylinder is used to provide a line of diffuse light on the film.

13 Claims, 3 Drawing Sheets

FIG. 1

ILLUMINATION SYSTEM FOR A FILM SCANNER

CROSS REFERENCE TO RELATED APPLICATIONS

Reference is made to U.S. patent applications: Ser. No. 373,309, entitled "Method and Apparatus for Generating a High Definition Electronic Signal From a Line Scan of a Color Original," filed on Jun. 29, 1989; Ser. No. 406,407, entitled "Motion Picture Telecine Balanced For Negative Scanning," filed on Sept. 12, 1989; Ser. No. 422,328, entitled "Telecine Scanning Apparatus With Spectrally-Shifted Sensitivities Responsive to Negative or Print Film Dyes," filed on even date herewith; and Ser. No. 421,893, entitled "A Beam Splitter For Color Imaging Apparatus," filed on even date herewith. All of these applications are assigned to the assignee of the present invention.

FIELD OF THE INVENTION

This invention relates to an illumination system for a film scanner, and more particularly, to an illumination system which is particularly suitable for use in a telecine film scanner.

DESCRIPTION OF THE PRIOR ART

A telecine film scanner typically includes a light-sensitive linear charge-coupled device (CCD) which provides a serial output representing a line of a television raster. For color television, the film scanner can include an assembly of three separate CCD arrays, one for each of the primary colors. The film is driven at a uniform rate past a light beam provided by an illumination system, and an illuminated section of the film is imaged onto each CCD array. The film motion provides the vertical (frame) scan, and the linear cycling of the CCD arrays provides the horizontal (line) scan. A scanner of this type is described in U.S. Pat. No. 4,205,337.

In film scanners, it is common to provide an illumination system which produces a line of light across the film. The light source in such systems produces a circularly symmetric light beam, and a problem in these systems is to provide for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed into one end of the cylindrical rod. Light reflected from the original is imaged onto a CCD line sensor.

Another type of illumination system for a film scanner is shown in U.S. Pat. No. 3,988,537. Light from a fluorescent lamp is directed onto a film through cylindrical lenses and an aperture plate having an elongated aperture therein. Light transmitted through the film is directed to a photosensor. One of the main problems of the illumination systems shown in the two patents is that they do not provide a uniform line of diffuse light to an original such as film, and thus, artifacts on the original, e.g. scratches, will appear in an image produced from the scanned information. A further disadvantage of the systems shown in the patents is that they are not adapted to change the spectral content of the illumination in accordance with the type of film being scanned.

SUMMARY OF THE INVENTION

It is an object of the present invention to overcome the problems in the prior art discussed above and to provide an improved illumination system for a film scanner.

In accordance with one aspect of the present invention there is provided an illumination system for a film scanner, the system being adapted to provide a line of illumination on a film which is supported for movement in a film gate of the scanner, the system comprising: a light source which is adapted to provide a light beam along an optical path in the system; filter means for receiving the light beam from the source and for controlling the spectral content of light issuing therefrom; and an integrating cylinder for receiving the light beam from the filters and for producing a line of diffuse illumination on the film.

In one embodiment of the present invention, an illumination system is provided for a film scanner in which a film is scanned as it is advanced through a film gate in the scanner. The illumination system includes a xenon lamp which produces a light beam which travels along an optical path to the film gate. The light beam from the xenon lamp passes through a hot mirror (IR reflector) and an IR absorber which filter IR radiation from the beam. From the IR absorber, the beam passes through a set of shaping filters and a $D_{min}$ filter. Certain of the shaping filters and the $D_{min}$ filter can be selectively removed from the optical path to provide for the scanning of both negative and print films. The beam from the filters is condensed into an integrating cylinder which provides a uniform line of diffuse light on the film. Light transmitted through the film passes through a projection lens which directs the light onto a beam splitter. The beam splitter divides the light into one light beam for a chrominance channel in the scanner and another beam for a luminance channel.

The present invention provides a number of advantages over known illumination systems for film scanners. A principal advantage of the disclosed illumination system is that it is particularly effective in suppressing the effects of film surface damage on a reproduced image. The illumination system produces an intense line of light having a highly uniform intensity along the line and a nearly uniform angular distribution. Temporal fluctuations in the light source are minimized by employing the light from the integrating cavity as a feedback signal to regulate the light source. Finally, selected sets of scanner spectral sensitivities are provided by shaping filter sets interposed in the optical path of the illumination system.

Other features and advantages will become apparent upon reference to the following description of the preferred embodiment when read in light of the attached drawings.

DESCRIPTION OF THE PREFERRED EMBODIMENT

Figure 1:
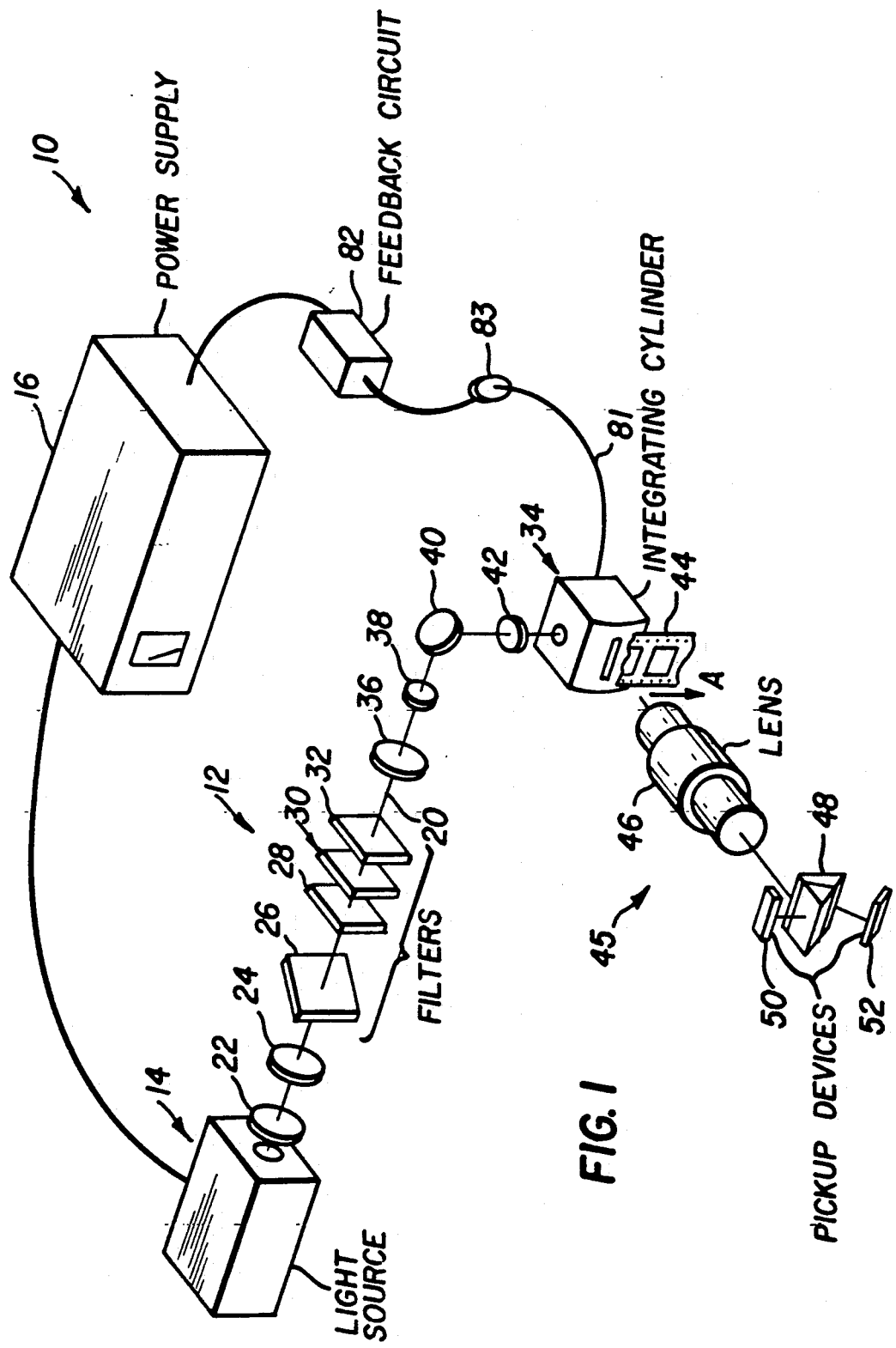
FIG. 1 is a schematic perspective view showing the illumination system of the present invention in combination with certain elements of a film scanner.

The illumination system of the present invention can be used with any film scanner which requires a line illumination of a film. However, it is particularly suitable for use with a telecine film scanner in which light from an illuminated line of film is divided into a luminance image and a chrominance image. Such a film scanner is disclosed in the aforementioned U.S. patent application, entitled "Method and Apparatus for Generating a High Definition Electronic Signal From a Line Scan of a Color Original," Ser. No. 373,309. The present invention can also be used with a telecine film scanner in which light from an illuminated section of the film is transmitted to three separate channels for processing, one channel for each of the primary colors. A film scanner of this type is disclosed in the aforementioned U.S. patent application entitled "Telecine Scanning Apparatus With Spectrally-Shifted Sensitivities Responsive to Negative or Print Film Dyes."

Motion picture print film is normally preferred for telecine scanning. The positive prints, in addition to being readily available, are already color balanced for direct viewing, and hence, they require fewer color corrections than a negative film. However, the making of a positive film print from the original negative film requires at least one extra processing step which results in some degradation of the image as well as color saturation of the resulting print relative to the negative. A negative film in a telecine scanner can handle the tone scale from highlights to shadows with less distortion than print film, resulting in better color reproduction. All things considered, therefore, it is desirable to be able to use both positive and negative films in a telecine scanner without undue inconvenience.

Ideally, a telecine scanner should measure the optical modulation caused by each dye in order to correctly estimate the red, green, and blue content of the original scene and produce a subjectively pleasing image. These measurements are difficult to obtain because the yellow, magenta, and cyan dyes used in film not only absorb light in the desired blue, green, and red bands of the spectrum, respectively, but each dye also absorbs in more than just the desired band. To eliminate the effects of the unwanted dye absorptions in the film and to improve color/tone scale quality, the ideal solution would be to have monochromatic telecine sensitivities at the three wavelengths corresponding to the peak absorptions of the three dyes. However, the narrower the spectral response of each color channel, the lower the system efficiency or sensitivity. In order to waste as little as possible of the available light, dichroic beam splitters and trimming filters are usually used to divide the light into three bands with slight overlaps in the 490 nm and 580 nm regions. Nonetheless, wide spectral responses result in color crosstalk (e.g., by measuring magenta dye in the cyan measurement channel), and further result in a system gamma that is, at least to some extent, a function of density rather than color. Telecine spectral sensitivity, therefore, is necessarily a compromise between sensitivity and color/tone scale quality.

With reference to FIG. 1, there is shown a film scanner 10 which includes an illumination system 12 constructed in accordance with the present invention. The illumination system 12 comprises a light source 14 which can be, for example, a xenon lamp. One suitable xenon lamp is a Model No. LX-300 f, manufactured by ILC Cermax Lamps. Other light sources can be used, e.g., a tungsten-halogen light source or a metal halide light source. However, the xenon lamp is preferred because it provides a white light source with a high blue light content, and, when run with feedback, it is relatively quiet. Power to light source 14 is supplied by a linear power supply 16, for example, a PS-300 power supply, obtainable from ILC Technology.

Light from light source 14 passes through a shutter 22 and a relay lens 24. From lens 24, light passes through a hot mirror (IR reflector) 26 which removes IR radiation from 800 to 1100 nm. From hot mirror 26 the light beam passes to an IR absorber 28 which filters out light from 1000 to 2500 nm. IR absorber 28 can be, for example, an IR absorber, Glass No. 4605, manufactured by Corning Glass. From IR absorber 28, the light beam passes through a shaping filter set 30 and a $D_{min}$, or base density, filter 32, as shown schematically in FIG. 1 and in more detail in FIG. 2. The filter set 30 and $D_{min}$ filter 32 are placed in the optical path during the scanning of positive film. During the scanning of negative film, the $D_{min}$ filter 32 is removed and a filter set 31 (FIG. 3) is substituted for the filter set 30. During calibration of the scanner 10, the filter set 31 and the $D_{min}$ filter 32 are placed in the optical path 20.

Light from $D_{min}$ filter 32, or from filter set 31 when $D_{min}$ filter 32 is removed, is directed to an integrating cylinder 34 through a relay lens 36, a first condensing lens 38, a plano mirror 40, and a second condensing lens 42. As will be discussed in more detail hereinafter, integrating cylinder 34 directs a diffuse line of light onto a film 44.

The light from integrating cylinder 34 is modulated by film 44 in accordance with the amounts of cyan, yellow, and magenta dye in the film, and the modulated beam passes to a pickup stage 45 of scanner 10. A projection lens 46 directs the light to a beam splitter 48 which includes a dichroic interference filter. Beam splitter 48 divides the light into one beam for a chrominance channel which is directed to a pickup device 50 and into a second beam for a luminance channel which is directed to a pickup device 52. A more complete description of beam splitter 48 can be found in the aforementioned U.S. patent application entitled "A Beam Splitter for Color Imaging Apparatus," filed on even date herewith.

The pickup devices 50 and 52 are conventional photosensitive elements, such as phototubes or charge-coupled devices. Charge-coupled devices (CCD's) are typically preferred for modern telecine film scanners because they require little maintenance and adjustment and they have a long life. Pickup device 50 in the chrominance channel could include three linear CCD arrays (one array for each of the primary colors) arranged side-by-side on a unitary structure. Color separation is provided by linear color filter strips overlying the arrays. Device 52 could be a linear CCD array which functions as a high resolution luminance sensor, or detail sensor. The output signals from the arrays 50 and 52 are provided to signal processing elements (not shown).

As noted above, $D_{min}$ filter 32 is inserted into the optical path 20 between the light source 14 and the pickup stage 45, during a calibration mode and during the scan of a print film. The motion picture film 44 is removed from the optical path 20 during calibration. Filter 32 is removed during the scan of a negative film, as shown schematically by the broken-line position of the filter 32 in FIG. 3. The filter 32 provides a color density substantially equivalent to the minimum base density of a negative motion picture film, that is, a density substantially equivalent to the mask density plus the residual minimum density of the negative material due to fog and the structure of the materials. With the filter 32 in the optical path 20, the scanner 10 is adjusted so that the output signals for red, green, and blue, from the pickup stage 45 are of equal amplitude. Further details on the use of the filter 32 are disclosed in the copending U.S. patent application Ser. No. 406,407, entitled "Motion Picture Telecine Balanced for Negative Scanning," filed on Sept. 12, 1989.

If the pickup devices 50 and 52 are charge-coupled devices, it is preferable to produce a full well condition, or a substantially full well condition, with the $D_{min}$ filter 32 in the optical path 20. This insures maximum signal-to-noise performance for negative material. Full well operation, or a substantial proportion thereof, is provided by supplying sufficient light energy to the pickup stage 45. Providing sufficient intensity in the light source 14, particularly in spectral regions rendered deficient by the negative mask density (i.e., blue), and providing appropriate "trim" with the source balance filter 68, generates sufficient light energy for substantially full well operation. In order to provide sufficient intensity in the light source, the earlier-mentioned xenon light source is the preferred source.

The shaping filter sets 30 and 31 provide a means for conforming the sensitivity of the telecine scanner 10, and particularly of the pickup devices 50 and 52 to the spectral dye densities of different film materials. It is highly beneficial if the pickup devices 50 and 52 are capable of evaluating dye density at the respective spectral peaks of the different materials. This means, in practice, that different red spectral sensitivities must be provided for different materials, although it is possible to customize any of the spectral regions for different materials.

The illumination system 12 of the present invention is adapted to be used in a telecine scanner of the type in which shaping of the spectral sensitivities is accomplished in two separate parts of the scanner. Red, green and blue channel filters, e.g., linear color filter strips (not shown), are provided in conjunction with pickup device 50 for separating the light into spectral regions. The bandwidths of the channel filters are broad enough to include the spectral dye densities of a negative motion picture film and a positive (print) motion picture film. More particularly, the channel filters have spectral bandwidths in the respective colors for the film type having the limiting wavelength requirement, i.e., filters that provide the longest wavelength cutoff for blue, the broadest green bandpass, and the shortest wavelength cutoff for red.

The second aspect of spectral shaping, i.e., the further shaping of the spectral regions for a particular film material, is accomplished by the shaping filter sets 30 and 31, for negative scanning and positive scanning, respectively.

Figure 3:
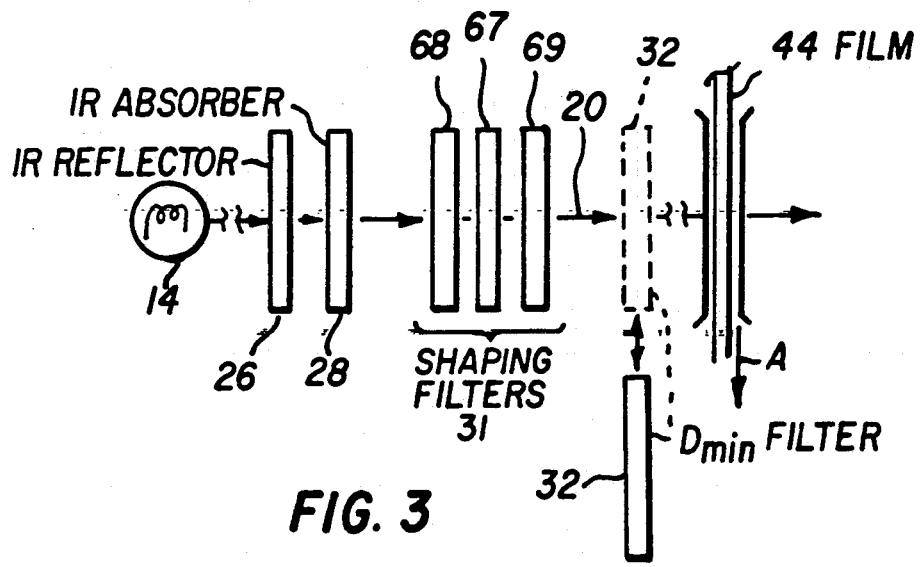
FIG. 3 shows a filter arrangement for the scanning of a negative material.

In a telecine scanner set up for negative motion picture film, as shown in FIG. 3, the filter set 31 includes an infrared (IR) cut filter 67, a source balance filter 68, and a red-green (RG) notch filter 69. The color filtering provided by the shaping filter set 31 for negative scanning, when combined with the color filtering provided by the channel filters (not shown), shape the low-band edge for blue sensitivity and to a lesser extent, the high-band edge for green sensitivity. Both band edges for red sensitivity are defined by the combination of the RG notch filter 69 and the IR cut filter 67. The effect in the red channel passband is to establish peak red sensitivity near the peak cyan dye density at 690 nm.

Figure 2:
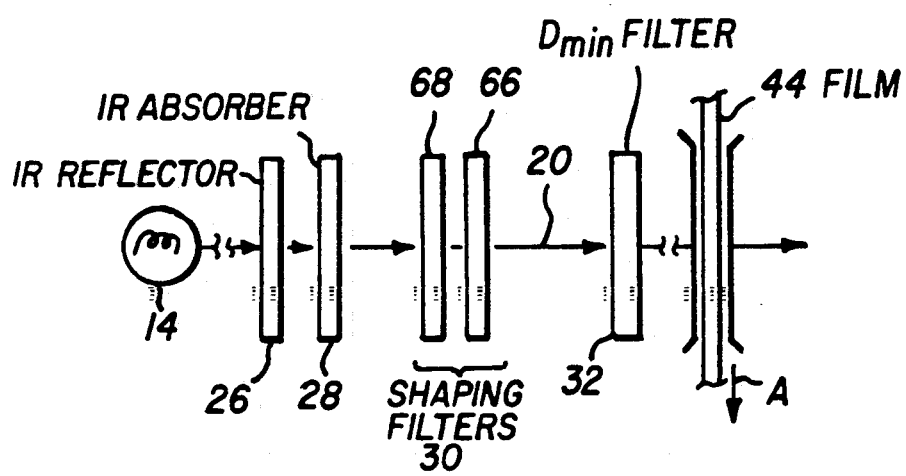
FIG. 2 shows a filter arrangement for the scanning of a print material.

For print scanning, the main objective is to shift red sensitivity downward toward the cyan dye density peak at 660 nm. The shaping filter set 30 used for print scanning, as shown in FIG. 2, includes source balance filter 68 and an infrared (IR) cut filter 66. The lower band-edge of the transmission characteristic of the IR cut filter 66 for print film is lower than the lower band-edge of the IR cut filter 67 for negative film. Consequently, the color filtering provided by the print shaping filter set 30, when combined with the color filtering provided by the color separation filters in the pickup stage, drives the passband of the red spectral region downward relative to negative scanning such that red sensitivity is centered more nearly on 660 nm.

The shaping filter sets 30 and 31 are preferably located in the illumination system between the light source 14 and the motion picture film 44. This is particularly important in scanner 10, since the pickup stage 45 provides an additional output to device 52 which serves as a detail sensor. Having the shaping filter sets 30 and 31 on the input side of the beam splitter 48 determines the red, green and blue content of the detail channel as well as the color channels.

Figure 4:
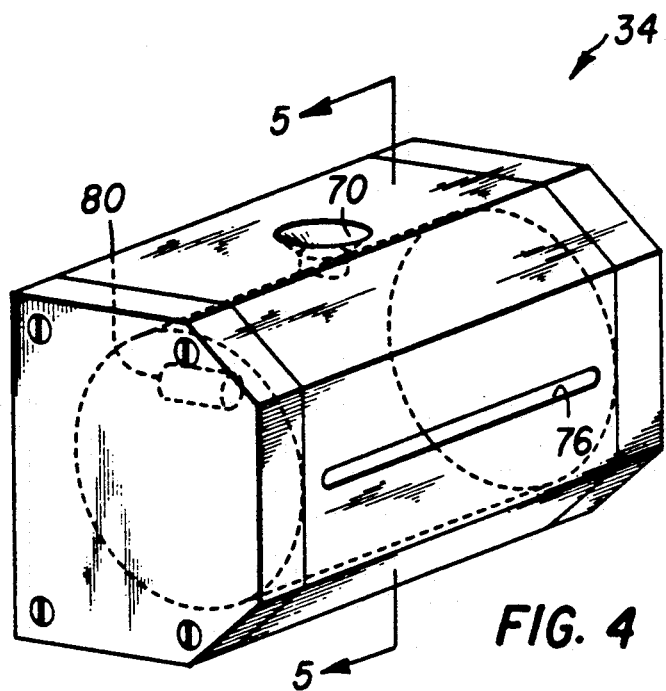
FIG. 4 is a perspective view of the integrating cylinder used in the illumination system.
Figure 5:
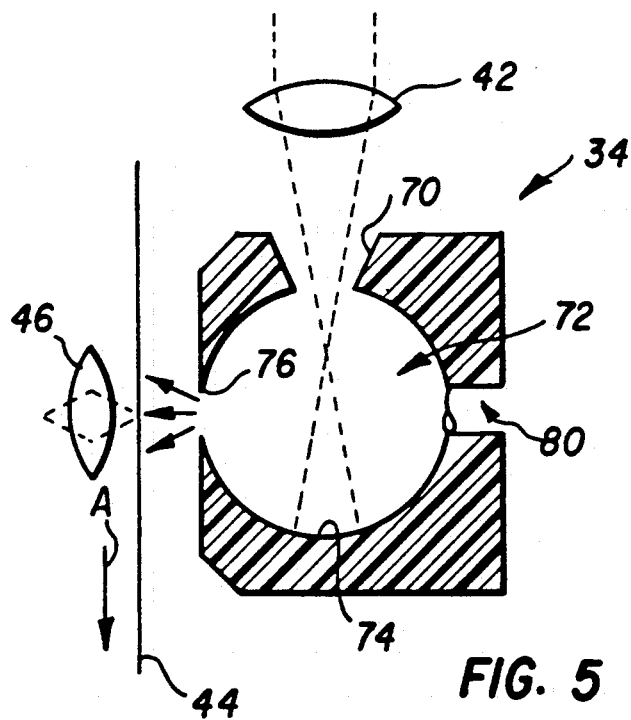
FIG. 5 is a schematic view showing the integrating cylinder in section, taken along the line 5—5 in FIG. 4, and further showing the arrangement of the cylinder relative to the film and lenses which function therewith.

The integrating cylinder 34 is shown in detail in FIGS. 4 and 5. Light is focused onto an input port 70 of a cylindrical integrating cavity 72 in cylinder 34. Preferably, the light is brought into a focus just inside the cavity, as shown in FIG. 5, and diverges before striking an opposite wall of the cavity 72. The internal surface 74 of the integrating cavity 72 is diffusely reflecting. The integrating cavity 72 defines an output slit 76 that emits a line of light to illuminate the film 44. In order to effect an area scan of the film, the image on the film 44 is sensed one line at a time by pickup stage 45 as the film is advanced in the direction of arrow A (FIG. 1). Temporal control of the illumination intensity is achieved by sampling the diffuse light from the integrating cavity 72. A feedback port 80 is provided in the cavity 72 to remove a sample of the diffuse light. The light exiting the feedback port 80 is directed by means of an optical fiber 81 to a photosensor such as a silicon photodiode 83. The output from photodiode 83 is provided to power supply 16 through a feedback circuit 82.

Integrating cavity 72 is preferably machined from a block of diffusely reflecting polytetrafluoroethylene plastic, known as Spectralon ™, available from the Labsphere Corporation, North Sutton, N.H. In one exemplary integrating cylinder, the integrating cavity is a circular cylinder 38 mm long and 20 mm in diameter. The input port 70 is a round hole 6–8 mm in diameter, the feedback port 80 is a round hole about 4 mm in diameter in the cavity 72. The exit slit 76 is 2 mm wide by 30 mm long.

It is important to obtain a uniform angular distribution of light from slit 76 in order to achieve maximum scratch suppression. Angular distribution of the light is determined by the configuration of the walls of cavity 74 adjoining slit 76, and a preferred configuration is shown in FIG. 5. In the use of a xenon light source with a cylinder 34 having a slit 76 as shown in FIG. 5, a uniform angular distribution of light can be obtained over an angle which extends from 45° above the optical axis to 45° below the optical axis. A more complete description of the integrating cylinder described herein can be found in the aforementioned U.S. patent application entitled "Linear Integrating Cavity Light Source," Ser. No. 241,637.

The individual elements of illumination system 12 operate together to provide an illumination system which is particularly suitable for use in a telecine film scanner. A key element in the illumination system is the integrating cylinder 34 which, as noted above, produces a line of illumination which has a uniform linear and angular distribution. The integrating cylinder is spatially source independent, i.e., input beam artifacts, from air currents, arc wander, obstructions, etc., are not seen in the cylinder output. The integrating cylinder also makes it possible to use a xenon lamp and a linear power supply. The xenon lamp is the preferred light source for a telecine film scanner because it provides a white light with a high blue content. When light from the integrating cylinder is used as a feedback signal to control the power to the xenon lamp, temporal fluctuations in the light from the lamp are minimized, and the lamp is relatively quiet. Integrating cylinder 34 is about 30% efficient, and thus, the illumination system can operate with a lamp of only about 300W. As a result of using a lamp of this size, a linear power supply can be used rather than a relatively noisy switching power supply.

The invention has been described in detail with particular reference to the preferred embodiment thereof, but it will be understood that variations and modifications can be effected within the spirit and scope of the invention. For example, light could be delivered to integrating cylinder 34 by means of an optical fiber or a plurality of optical fibers. In the use of optical fibers in this manner, it will be apparent to those skilled in the art that separate light sources and separate fiber optic channels could be used for each of the primary colors, and the light from the separate channels could be combined before the light is delivered to the integrating cylinder.

We claim:

1. An illumination system for a film scanner, said system being adapted to provide a line of illumination on a film which is supported for movement in a film gate of the scanner, said system comprising:
   a light source which is adapted to provide a light beam along an optical path in said system;
   filter means for receiving said light beam from said source and for controlling the spectral content of light issuing therefrom for different types of film, said filter means including shaping filter means selectively insertable in said light path for substantially conforming at least one spectral region to the peak spectral density of a corresponding film dye in a particular type of film; and
   an integrating cylinder for receiving said light beam from said filter means and for producing a line of diffuse illumination on said film.

2. An illumination system, as defined in claim 1, wherein said light source is a xenon lamp.

3. An illumination system, as defined in claim 1, wherein said filter means includes a base density filter which can be selectively inserted in said optical path.

4. An illumination system, as defined in claim 1, wherein said shaping filter means further confines said one spectral region to a passband corresponding to the spectral dye density of said corresponding film dye.

5. An illumination system, as defined in claim 1, wherein said shaping filter means conforms the peak sensitivity of at least the red spectral passband to a spectral region substantially corresponding to the peak density of the cyan dye of a selected film.

6. An illumination system, as defined in claim 5, wherein said shaping filter means includes an infrared cut filter which operates to conform the peak sensitivity of said red spectral passband to the peak density of the cyan dye of a print film.

7. An illumination system, as defined in claim 5, wherein said shaping filter means includes a notch filter having a transmission null between green and red and an infrared cut filter, and said notch and cut filters operating together to conform the peak sensitivity of said red spectral passband to the peak sensitivity of the cyan dye of a negative film.

8. An illumination system, as defined in claim 1, wherein said integrating cylinder has an elongated cylindrical light integrating cavity having diffusely reflecting walls, and said cylinder includes an output slit communicating with said cavity through which the line of illumination exits.

9. An illumination system, as defined in claim 8, wherein the integrating cavity is about 38 mm long by about 20 mm in diameter, and the output slit is about 30 mm long by about 2 mm wide.

10. An illumination system, as defined in claim 1, wherein said filter means includes a hot mirror.

11. An illumination system, as defined in claim 1, wherein relay lenses are located in said optical path on opposite sides of said filter means.

12. An illumination system, as defined in claim 1, wherein optical means are located in said optical path between said filter means and said integrating cylinder for focussing light in said cylinder.

13. An illumination system, as defined in claim 12, wherein said optical means includes a pair of condensing lenses.

* * * * *